H. A. HUSTED.
AUTOMOBILE STEERING WHEEL LOCK.
APPLICATION FILED JAN. 11, 1918.

1,324,823.

Patented Dec. 16, 1919.
2 SHEETS—SHEET 1.

WITNESSES

INVENTOR
Harry A. Husted
by Fred W. Winter
his Attorney

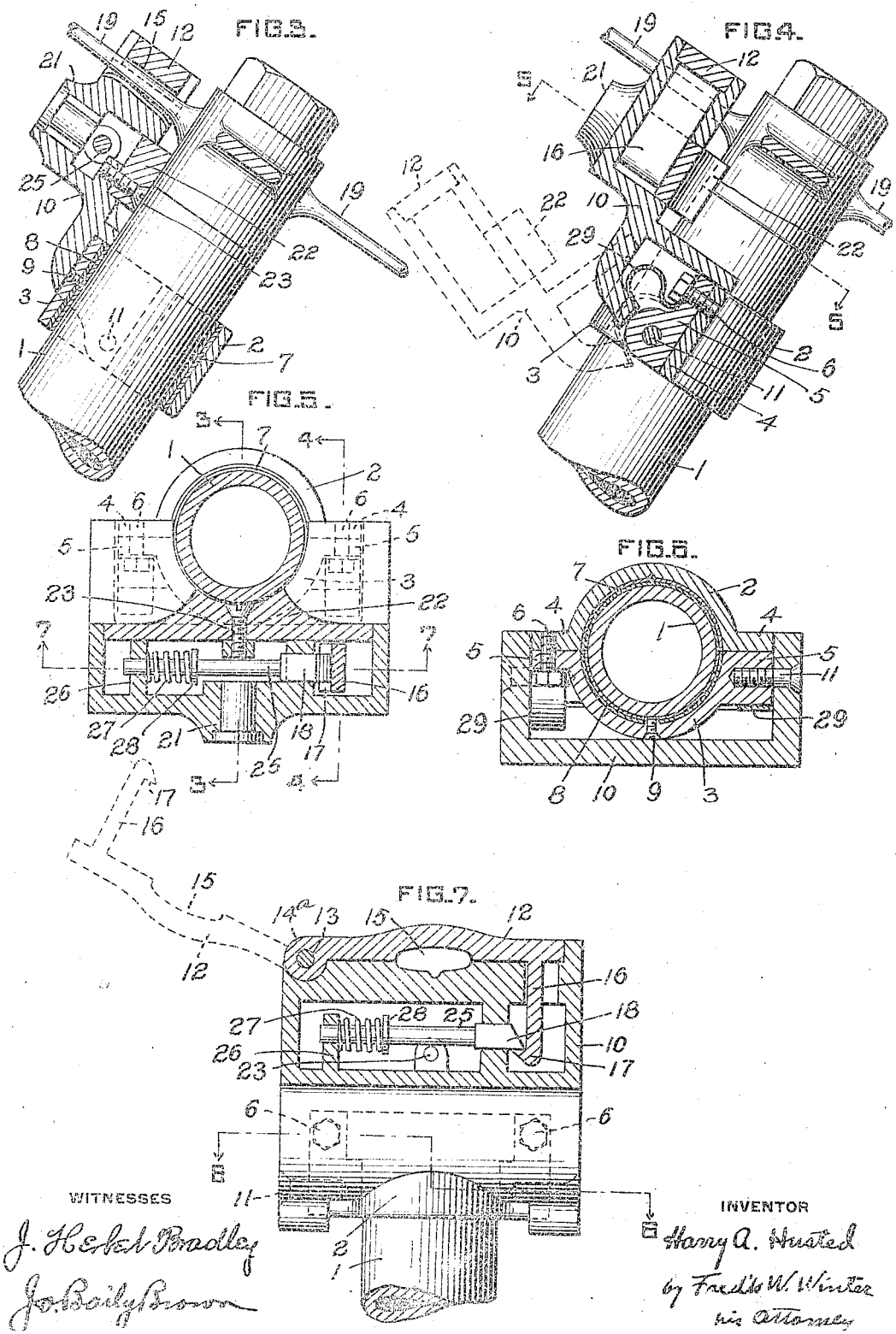

UNITED STATES PATENT OFFICE.

HARRY A. HUSTED, OF YOUNGSTOWN, OHIO, ASSIGNOR TO THE HUSTED MANUFACTURING CO., OF YOUNGSTOWN, OHIO.

AUTOMOBILE-STEERING-WHEEL LOCK.

1,324,823.  Specification of Letters Patent.  Patented Dec. 16, 1919.

Application filed January 11, 1918. Serial No. 211,337.

*To all whom it may concern:*

Be it known that I, HARRY A. HUSTED, a resident of Youngstown, in the county of Mahoning and State of Ohio, have invented a new and useful Improvement in Automobile-Steering-Wheel Locks, of which the following is a specification.

This invention relates to locks for automobiles.

More particularly the object of the invention is to provide a lock for motor vehicles, which when applied prevents the steering of the vehicle, and which also prevents movement of the car in a normal forward direction, so as to prohibit its being towed behind another car. Other objects of the invention are to provide a lock which will be strong, which can not be easily broken or pried open by chisels and such tools, which will not rattle, in which all of the removable parts will be covered when the lock is closed, and in which the general construction will be simple, economical, and durable. Other objects and advantages will appear throughout the following specification, and will be apparent to those familiar with such devices.

Figure 1:
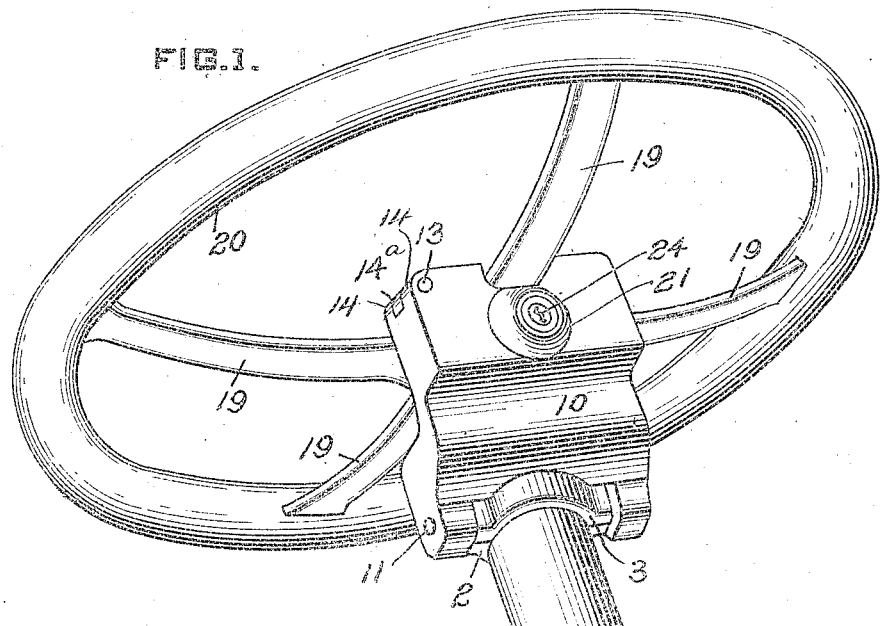
Figure 2:
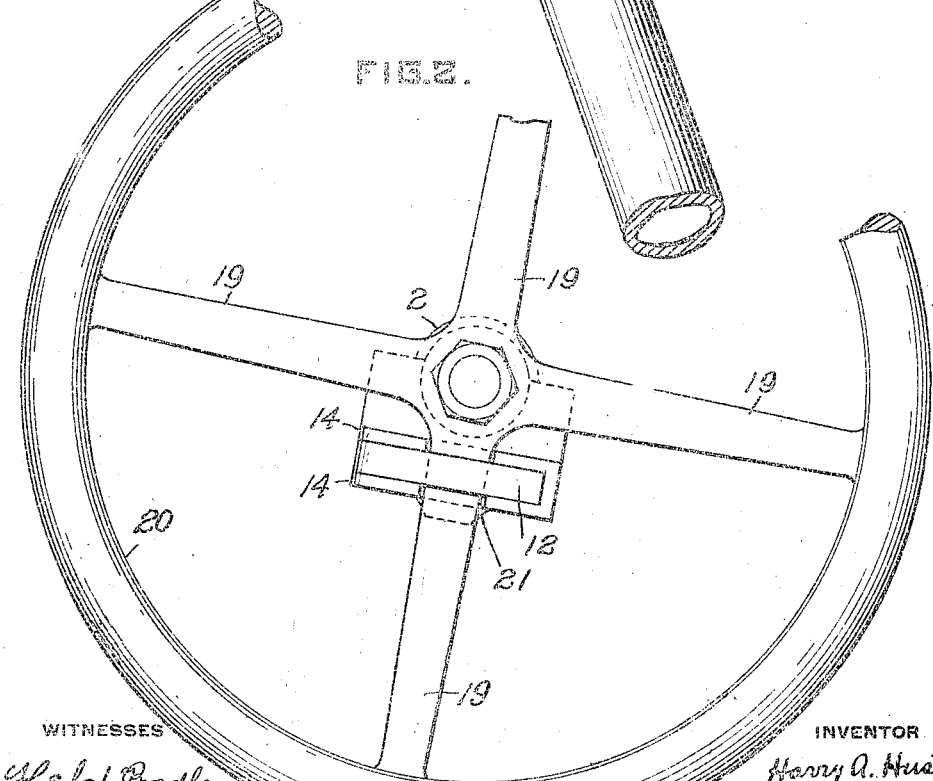

Referring to the drawings, Figure 1 is a perspective view showing the lock applied, and in operation on an ordinary automobile steering wheel; Fig. 2 is a plan view of the steering wheel with the lock applied; Fig. 3 is a section through the lock parallel to the steering post, on the line 3—3 of Fig. 5. Fig. 4 is a section similar to that of Fig. 3, but taken on a different line, and in dotted line indicating the lock in disengaged position; Fig. 5 is a cross section through the steering post and lock on the line 5—5 of Fig. 4; Fig. 6 is a cross section on the line 6—6 of Fig. 7; and Fig. 7 is a section on the line 7—7 of Fig. 5.

With the multiplication of automobiles during the last few years, it has been rendered very easy to steal cars, either permanently or merely for temporary use. In cities this practice has reached large proportions, and the necessity of efficient locking means has become continuously more apparent. Various forms of locks have been used, the ordinary one being a key controlling the ignition switch. This latter form of lock, however, is not very efficient, since a person familiar with the structure of automobiles can usually short circuit the connecting wires beyond the switch and render the lock ineffective. Furthermore, the keys for such switch locks are usually not intricate, and a master key will open the locks of all cars of a certain make, or may be of several makes.

The present invention proposes to avoid the difficulties experienced in previous constructions by making a mechanical lock applicable directly to the steering wheel. This does not affect the ignition or running of the engine, but simply renders it impossible to steer the car. Manifestly this renders the driving away of the automobile so locked impossible.

The device is applied to the steering post 1 of an automobile by means of two semi-circular castings 2 and 3, having at their edges flanges 4 and 5, respectively, adapted to be secured together by screws 6, through said flanges. The screws 6 preferably have regular bolt heads, positioned inside the casing so that they can not be removed when the lock is applied.

The semi-circular members 2 and 3 may be made of any desired size, in order to fit steering posts of various diameters, but it is preferable to make these members of a large standard size and to fit them to any size steering post by applying a suitable number of shims, to fill in any space that may be left between a smaller steering post, and the semi-circular members 2 and 3. These shims are made in semi-circular parts 7 and 8, to go under the members 2 and 3, respectively. The shims 7 are punched up, or corrugated, so as to fit into each other at one point, and the last shim has its raised portion fitting into a cavity on the inside of member 2. This is for the purpose of preventing the shims from being slipped out, and for holding them accurately positioned. The other set of shims 8 has a hole through the middle, and a screw 9 passes therethrough. This screw 9 is made with a sharp point, and is case hardened. It passes through a threaded hole in the middle part of the clamping member 3 and is driven in until the sharp point has been embedded in the steering post 1, after which the screw head is filed off leaving the screw body flush with the outer surface of the member 3, thus permanently locking the clamping members 2 and 3 against movement on the post 1, and preventing the removal of the screw itself.

A main casing member 10 is pivotally mounted on the clamping member 3 by means of screws 11. These screws are preferably made with a threaded tip portion, and a cylindrical shank. The threaded portion fits into threaded holes in the clamping member 3, and the smooth portion of the screw is left to form a pivotal mounting for the main casing 10. After the screws have been driven to their normal position in the member 3, their heads are filed or ground off, flush with the surface of the casing 10, so that they can not be removed by any ordinary tools, for the purpose of picking the lock.

The portion of the casing 10 through which the screws 11 pass, is extended below the meeting line of flanges 4 and 5, as shown in Figs. 1 and 6, so that a chisel can not be driven in through the sides to separate these flanges. At the end of the casing member 10 opposite that of its attachment to the member 3, is mounted a latch 12, by means of a screw 13, extending through two lugs 14, on the casing, and a central dove-tailed lug 14$^a$ on the latch 12. The screw 13 is preferably threaded at each end, adapted to engage threaded bores in the lugs 14, and smooth at its middle portion, forming a bearing for the latch member 12. A cylindrical bore through the lug 14$^a$ is adapted to fit over the pin at its middle point. After the screw 13 has been turned in to proper engagement both ends are filed off flush with the casting so that the screw can not be taken out with any ordinary tools. The latch has a channel 15 on the underside near its middle point, and at its free end an extension 16 carries a beveled locking lug 17, adapted to engage a spring pressed beveled edge locking bolt head 18, positioned inside the main casing 10, and forming a portion of the lock below described. The upper end of the casing member 10, beneath the channel 15 in the latch member, is cut away to coöperate with the channel 15, in order to present sufficient space to permit passage of one of the spider arms 19, of a steering wheel 20. The channel 15, and corresponding channel in the main casing member, together form a spoke-engaging opening, as shown in Fig. 7, and this opening may be of any desired size and shape, so as to properly engage the spider arm of any particular design of steering wheel.

The main casing member 10 is formed with a lock receiving chamber, open from the inner side of the casing. A round hole extends from this chamber, through a circular projection 21, on the upper side of the casing 10. The chamber referred to is adapted to receive a lock, which may be of any desired form or make, and the key receiving portion of the lock is passed through the bore in the extension 21, as shown in Figs. 1, 2, and 3. The chamber containing the lock is closed by a member 22, fastening to the main casing by screw 23, the head of which lies on the underside of the main lock, where it is not accessible for removal, while the lock is in position on the steering post.

The lock itself, may be of any desired form, and as details of that mechanism are not peculiar to this invention, they are not fully described herein. The lock has an exterior key hole 24, and the key inserted therethrough is adapted to engage the locking bolt member 25, positioned across the interior lock cavity, and having at one end the beveled latch head 18, and having its other end slidably mounted in a raised lug 26. A coil spring 27 bears against the lug 26 at one end, and against a collar 28 at the other end, constantly driving the beveled head 18 into locking position. By this mechanism, a spring latch is provided so that the latch member 12 is locked by simply pressing it down until the beveled lug 17 passes below the bolt head 18, after which to release the lock it is necessary to pull the bolt 25 out of engagement with a key.

Preferably, also a spring 29 is mounted between the main casing 10, and the clamping member 3, so that when the latch 12 is raised, releasing the spider arms 19, the main locking casing 10 will drop down out of engagement with the steering wheel, into the position shown in dotted lines in Fig. 4, and will be retained in that position under spring pressure while the vehicle is in use. The pressure of the spring 29 is adapted to prevent any rattling or noise that might otherwise result from vibration of the car when the lock is disengaged.

The lock is mounted on the steering post so that the opening shown in Fig. 7, which is adapted to fit over one of the spider arms 19, is a little to one side of the vertical diameter of the steering post. Steering wheels are attached to the steering post so that the spiders, four in number, 90° apart, are in respective vertical and horizontal position with respect to the steering post, when the vehicle is being steered directly ahead. By positioning this lock a little out of the vertical plane, the steering wheel will be held so that the vehicle front wheels will be directly slightly to one side, and consequently, if the vehicle is driven, it will necessarily move in a circle. This will result in running it off any straight road, and will also prevent its being towed.

I claim:

1. An automobile lock, comprising a split member embracing the steering post, means for clamping the same rigidly to the steering post, a lock-containing member pivotally attached to said split member and arranged to swing into and out of engagement with the steering wheel and formed, when in wheel engaging position, to conceal the clamping means and joint of said split member, the pivot connecting the lock-containing member to the split member comprising two portions separated by the metal of the split member and each terminating flush with the exterior surface of said members, and means for locking said lock-containing member to the steering wheel.

2. An automobile lock comprising a member rigidly clamped on the steering post, a lock-containing member pivotally attached to said rigid member and arranged to swing into and out of engagement with a spoke of the steering wheel immediately adjacent to the hub thereof, a latch member carried by said lock-containing member and arranged to pass over the spoke, said lock-containing member being provided with a recess from its face which lies in contact with the steering post when said member is in locking position, and a locking member in said recess arranged to engage said latch.

3. An automobile lock comprising a member clamped on the steering post, a lock-containing casing pivotally attached to the clamped member so as to swing into and out of engagement with a spoke of the steering wheel immediately adjacent to the hub thereof, a spring normally throwing the lock casing out of engagement with the wheel, and a latch member mounted on the lock casing and adapted to pass over the spoke and lock it in fixed relation to the casing.

4. An automobile lock, comprising a member rigidly secured on the steering post, a lock-containing member pivotally attached to said rigid member and arranged to swing into and out of engagement with the steering wheel, means for locking said last named member to the steering wheel, and a spring normally concealed between said rigid member and said pivoted member and arranged to throw said pivoted member to open position and hold it against rattling when in unlocked position.

In testimony whereof, I have hereunto set my hand.

HARRY A. HUSTED.

Witnesses:
G. H. LERESCHE,
SUE B. FRITZ.